(12) United States Patent
Hanawa et al.

(10) Patent No.: US 12,275,368 B2
(45) Date of Patent: Apr. 15, 2025

(54) AIRBAG DEVICE FOR PEDESTRIAN

(71) Applicant: Autoliv Development AB, Vargarda (SE)

(72) Inventors: Akifumi Hanawa, Kanagawa (JP); Atsushi Tamura, Kanagawa (JP); Satoshi Ito, Kanagawa (JP)

(73) Assignee: Autoliv Development AB, Vargarda (SE)

( * ) Notice: Subject to any disclaimer, the term of this patent is extended or adjusted under 35 U.S.C. 154(b) by 0 days.

(21) Appl. No.: 18/003,844

(22) PCT Filed: Jun. 30, 2021

(86) PCT No.: PCT/JP2021/024831
§ 371 (c)(1),
(2) Date: Dec. 29, 2022

(87) PCT Pub. No.: WO2022/004814
PCT Pub. Date: Jan. 6, 2022

(65) Prior Publication Data
US 2023/0249642 A1    Aug. 10, 2023

(30) Foreign Application Priority Data

Jul. 3, 2020  (JP) ................................ 2020-115352

(51) Int. Cl.
*B60R 21/00*  (2006.01)
*B60R 21/36*  (2011.01)
*B60R 21/34*  (2011.01)

(52) U.S. Cl.
CPC ...... *B60R 21/36* (2013.01); *B60R 2021/0004* (2013.01); *B60R 2021/346* (2013.01)

(58) Field of Classification Search
CPC ............ B60R 21/36; B60R 2021/0004; B60R 2021/346
See application file for complete search history.

(56) References Cited

U.S. PATENT DOCUMENTS 3,820,814 A    6/1974  Allgaier et al.
7,584,988 B2 * 9/2009  Okamoto ................ B60R 21/36
                                                         180/274

(Continued)

FOREIGN PATENT DOCUMENTS

DE    10014832 A1 * 10/2001 ............. B60R 21/36
JP    7-329693 A    12/1995

(Continued)

OTHER PUBLICATIONS

JP 2017171269 A machine translation from espacenet.com (Year: 2023).*

*Primary Examiner* — Paul N Dickson
*Assistant Examiner* — Maxwell L Meshaka
(74) *Attorney, Agent, or Firm* — Harness, Dickey & Pierce, P.L.C.; Stephen T. Olson

(57) ABSTRACT

The pedestrian airbag device includes an airbag cushion that expands and deploys from below the front hood toward the windshield. The airbag cushion has a main chamber covering at least the lower part of the windshield, a pillar chamber covering the A-pillar, provided at both ends of the main chamber in the vehicle width direction, a compartment wall partitioning the main chamber and the pillar chamber, an inner vent penetrating the compartment wall through which gas can pass, a bridge over the inner vent, and a patch attached so as to cover the inner vent on the pillar chamber side of the compartment wall, such that a portion is separable from the compartment wall.

13 Claims, 6 Drawing Sheets

(56) References Cited

U.S. PATENT DOCUMENTS

| | | | | |
|---|---|---|---|---|
| 7,735,862 B2* | 6/2010 | Choi | B60R 21/2346 | 280/743.1 |
| 7,836,996 B2* | 11/2010 | Kitte | B60R 21/36 | 180/274 |
| 8,905,432 B2* | 12/2014 | Nakashima | B60R 21/26 | 280/732 |
| 8,985,257 B2* | 3/2015 | Tanaka | B60R 21/36 | 180/274 |
| 9,533,652 B1* | 1/2017 | Paxton | B60R 21/233 | |
| 9,650,014 B2* | 5/2017 | Suemune | B60R 21/36 | |
| 10,000,180 B2* | 6/2018 | Higashimachi | B60R 21/36 | |
| 10,919,484 B2* | 2/2021 | Ito | B60R 21/2334 | |
| 10,953,845 B2* | 3/2021 | Nakamura | B60R 21/0134 | |
| 10,967,830 B2* | 4/2021 | Nakamura | B60R 21/0136 | |
| 11,014,525 B2* | 5/2021 | Kanno | B60R 21/0134 | |
| 11,358,563 B2* | 6/2022 | Nagasawa | B60R 19/205 | |
| 11,702,031 B2* | 7/2023 | Nagasawa | B60R 21/36 | 180/274 |
| 2007/0023223 A1* | 2/2007 | Okamoto | B32B 17/10761 | 180/274 |
| 2007/0114090 A1* | 5/2007 | Okamoto | B60R 21/36 | 180/274 |
| 2009/0242308 A1* | 10/2009 | Kitte | B60R 21/36 | 180/271 |
| 2013/0341894 A1* | 12/2013 | Nakashima | B60R 21/232 | 280/730.2 |
| 2014/0291054 A1* | 10/2014 | Tanaka | B60R 21/36 | 180/274 |
| 2014/0291055 A1* | 10/2014 | Tanaka | B60R 21/36 | 180/274 |
| 2016/0229373 A1* | 8/2016 | Higashimachi | B60R 21/36 | |
| 2016/0264093 A1* | 9/2016 | Suemune | B60R 21/36 | |
| 2019/0061671 A1* | 2/2019 | Jang | B60R 21/233 | |
| 2019/0366971 A1* | 12/2019 | Nakamura | B60R 21/36 | |
| 2019/0366972 A1* | 12/2019 | Nakamura | B60R 21/36 | |
| 2019/0375366 A1* | 12/2019 | Kanno | B60R 21/36 | |
| 2020/0010045 A1* | 1/2020 | Ito | B60R 21/36 | |
| 2021/0197757 A1* | 7/2021 | Nagasawa | B60R 19/205 | |
| 2022/0097648 A1* | 3/2022 | Nagasawa | B60R 21/36 | |
| 2022/0306026 A1* | 9/2022 | Nagasawa | B60R 21/36 | |
| 2023/0249642 A1* | 8/2023 | Hanawa | B60R 21/36 | 180/274 |

FOREIGN PATENT DOCUMENTS

| | | | | |
|---|---|---|---|---|
| JP | 2000-52916 A | | 2/2000 | |
| JP | 2007238098 A | * | 9/2007 | B60R 21/36 |
| JP | 2013-193492 A | | 9/2013 | |
| JP | 2015-157616 A | | 9/2015 | |
| JP | 2017-171269 A | | 9/2017 | |
| JP | 2019-151203 A | | 9/2019 | |
| JP | 2020011712 A | * | 1/2020 | B60R 21/20 |
| KR | 20160043274 A | * | 4/2016 | |
| WO | WO-2017163898 A1 | * | 9/2017 | B60R 21/36 |
| WO | WO-2022044578 A1 | * | 3/2022 | B60R 21/36 |

* cited by examiner

A Part

B-B

C-C

AIRBAG DEVICE FOR PEDESTRIAN

TECHNICAL FIELD

The present invention relates to a pedestrian airbag device having an airbag cushion that expands and deploys from below a front hood of a vehicle toward a windshield.

BACKGROUND TECHNOLOGY

In recent years, pedestrian airbag devices have been developed to protect pedestrians outside a vehicle, as an airbag device that differs from devices that restrain occupants inside the vehicle. Primarily, pedestrian airbag devices are configured to expand and deploy an airbag cushion at a position where there is a possibility that the body of the pedestrian would contact, such as a windshield or the like, when a sensor installed in the front portion of the vehicle detects contact with a pedestrian.

For example, the pedestrian airbag device 10 of Patent Document 1 has an airbag 11 providing a pillar covering part 11b that covers the A-pillar 5, in order to prevent pedestrian contact with the highly rigid A-pillar 5. The technology of Patent Document 1 partitions a main portion 11a of the airbag 11 and a pillar covering part 11b by a partition cloth 20, and a tether 40 that serves as a check valve is provided in a gas passage opening 23 in the partition cloth 20, in order to maintain high pressure in the pillar covering part 11b.

PRIOR ART DOCUMENTS

Patent Documents

Patent Document 1: Japanese Unexamined Patent Application 2017-171269

SUMMARY OF THE INVENTION

However, the partition cloth 20 of Patent Document 1 may extend when a force is applied by the gas passage opening 23. For example, in FIG. 9(a) of Patent Document 1, when the gas pressure causes an upper panel 15 and a lower panel 16 to separate from each other, the partition cloth 20 is pulled in the vertical direction. At this time, if the partition cloth 20 is excessively elongated, the tether 40 may protrude and inhibit moving away from the gas passage opening 23. If the tether 40 cannot readily move away from the gas passage opening 23, the gas flow into the pillar covering part 11b will be impeded, resulting in insufficient pedestrian protection on the A-pillar 5.

Problem to be Solved by the Invention

In light of these problems, an object of the present invention is to provide a pedestrian airbag device that can adequately protect pedestrians at the A-pillar.

Means for Solving the Problems

In order to resolve the aforementioned problem, a typical configuration of the pedestrian airbag device of the present invention has an airbag cushion that expands and deploys from below a front hood of a vehicle toward a windshield, and an inflator that supplies gas to the airbag cushion, wherein the airbag cushion includes:

a main chamber that receives gas from the inflator and expands and deploys to cover at least a lower portion of the windshield;

a pillar chamber is provided at both ends of the main chamber in the vehicle width direction and receives gas from the main chamber in order to expand and deploy so as to cover the A-pillar;

a compartment wall dividing the main chamber from the pillar chamber; an inner vent penetrating the compartment wall through which the gas can pass;

a bridge that passes over the inner vent; and a patch attached to the pillar chamber side of the compartment wall so as to cover the inner vent, that can be partially separated from the compartment wall.

According to the configuration described above, the inner vent is bridged over, which suppresses spreading of the inner vent, as well as elongation of the compartment walls and patches. Thereby, the patch can be prevented from stretching and protruding, when, for example, the compartment wall is pulled in a prescribed direction, thus retaining the slack in the patch. In other words, the configuration described above can maintain the patch to be separable from the compartment wall, and thereby smooth expansion and deployment of the pillar chamber and adequate protection of pedestrians can be achieved.

The main chamber receives gas from the inflator, and expands and deploys in the vehicle width direction so as to cover at least a lower portion of the windshield;

the pillar chamber receives gas from the main chamber and expands and deploys in a state that extends from both sides of the main chamber in the vehicle width direction along the A-pillar to the rear of the vehicle beyond the vehicle door mirrors; and the compartment wall is provided in a range between a first imaginary line extending from an inner corner formed at a prescribed location on the rear edge of the airbag cushion between the main chamber and the pillar chamber to the front of the vehicle, and a second imaginary line extending along the rear edge of the door mirror in the vehicle width direction.

The area from the first imaginary line to the second imaginary line of the airbag cushion is the region that covers the highly rigid front portion of the vehicle, such as the side edges of the vehicle hood, A-pillar, and even door mirrors. It is possible to adequately prevent pedestrian contact with highly rigid parts such as the A-pillar and door mirrors, by providing a compartment wall in this range to hold the expansion pressure of the pillar chamber.

A portion of the main chamber may expand and deploy to overlap the upper side of the front hood near the rear end. The main chamber of this configuration can also provide adequate protection for pedestrians.

The patch may have slack that allows separation from the compartment wall. The patch suitably allows gas to pass through as the slack area is separated from the compartment wall.

The slack of the patch may be formed by attaching at least two locations of the patch at a prescribed spacing to two locations on the compartment wall at spacing that is shorter than the aforementioned interval. This configuration makes it possible to suitably achieve a patch with slack.

The bridge described above may be provided to bisect the inner vent in the width direction of the vehicle when the airbag cushion is expanded and deployed. The bridge in this configuration prevents the inner vent and compartment walls from extending in the vertical direction.

The bridge may be provided to bisect the inner vent in the vertical direction when the airbag cushion is expanded and deployed. The bridge in this configuration prevents the inner vent and compartment walls from extending in the width direction of the vehicle.

The bridge may be provided in a shape that intersects in the inner vent. The bridge in this configuration allows for more efficient suppression of unforeseen deformation of the inner vent and compartment wall.

Effect of the Invention

According to the present invention, a pedestrian airbag device that can adequately protect pedestrians at the A-pillar can be provided.

MODE FOR CARRYING OUT THE INVENTION

Preferred Embodiments according to the present invention will hereinafter be described in detail with reference to the attached drawings. Dimensions, materials, other specific numerical values, and the like indicated in the Embodiments are merely examples for ease of understanding of the invention and do not limit the present invention unless otherwise noted. Note that in the present specification and drawings, elements having essentially identical functions and configurations are labeled with identical symbols in order to omit redundant descriptions along with an illustration of elements not directly related to the present invention.

Figure 1A:
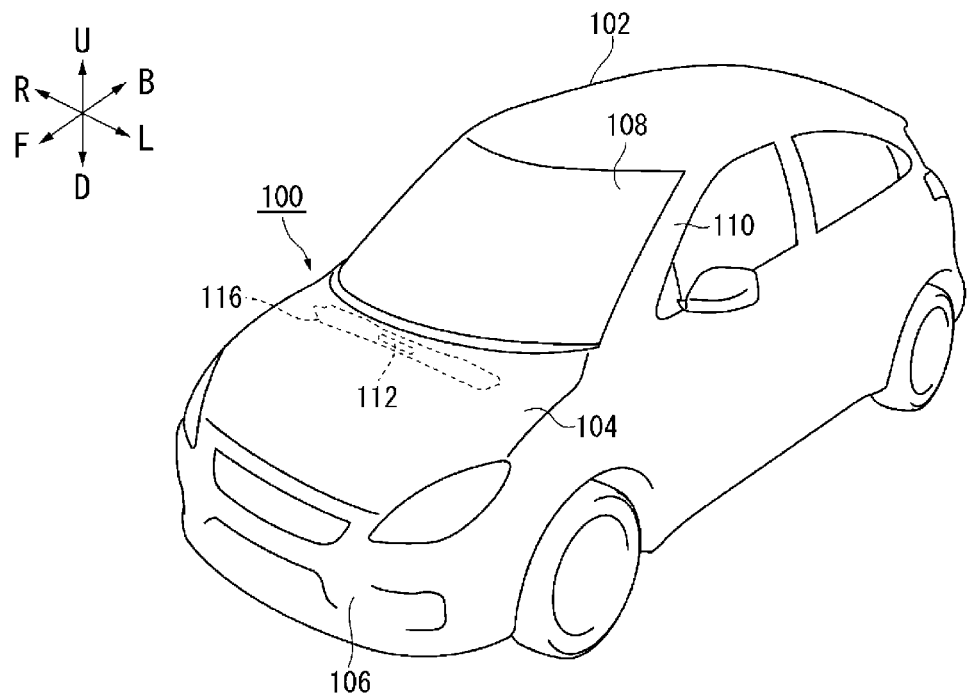
FIG. 1 is a diagram illustrating an overview of a pedestrian airbag device according to an embodiment of the present invention.
Figure 1B:
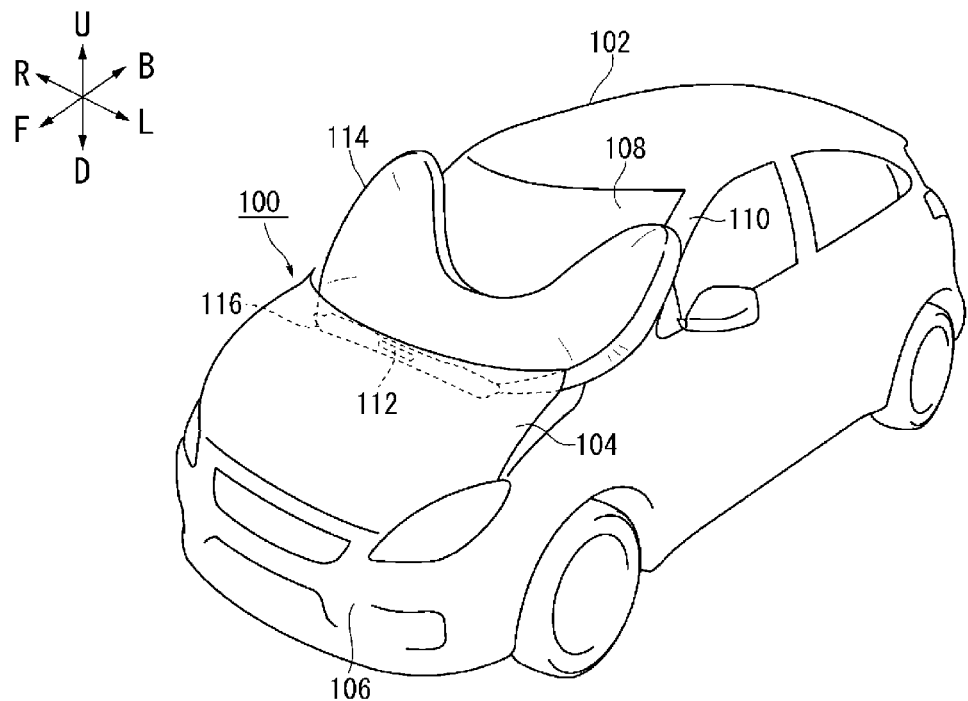

FIG. 1 is a diagram illustrating an overview of a pedestrian airbag device 100 according to an embodiment of the present invention. FIG. 1(a) is a diagram illustrating a vehicle before the pedestrian airbag device 100 is activated, and FIG. 1(b) is a diagram illustrating a vehicle when the pedestrian airbag device 100 is activated. Regarding FIG. 1 and other figures, a vehicle front-rear direction is illustrated by the symbols F (Front) and B (Back), a vehicle width direction of the vehicle by the symbols L (Left) and R (Right), and a vehicle up-down direction by the symbols U (Up) and D (Down).

As illustrated in FIG. 1(a), the pedestrian airbag device 100 is installed under a front hood 104 of a vehicle 102. The pedestrian airbag device 100 is equipped with a sensor, (not illustrated), at a location where a leg or other part of a body of a pedestrian is likely to come into contact, for example, inside a vicinity of a front bumper 106. The device is configured such that when the sensor detects contact with a pedestrian, an activation signal is sent to a gas generating device known as an inflator 112 via a controller or the like, and an airbag cushion 114 expands and deploys from below the front hood 104 toward a windshield 108, as illustrated in FIG. 1(b).

As illustrated in FIG. 1(a), the pedestrian airbag device 100 has a housing 116 that stores the airbag cushion 114. The housing 116 is a long, box-like container made primarily of resin, which stores the airbag cushion 114 (see FIG. 1(b)), the inflator 112, and the like. The housing 116 is mounted on the underside of the front hood 104 via a special bracket or the like, with the longitudinal direction thereof facing the vehicle width direction.

The inflator 112 is secured to the inside of the housing 116 using a stud bolt (not illustrated), and is actuated by an impact detection signal sent from a prescribed sensor so as to supply gas to the airbag cushion 114. The airbag cushion 114 begins to expand based on the gas from the inflator 112, cleaves the housing 116 due to the expansion pressure, and expands and deploys toward the windshield 108.

The inflator 112 in the present embodiment is a cylinder type. Examples of currently prevailing inflators include: types which are filled with a gas generating agent and burn the agent to generate gas; types which are filled with compressed gas and supply gas without generating heat; hybrid types which utilize both combustion gas and compressed gas; and the like. Any type of inflator can be used as the inflator 112.

As illustrated in FIG. 1(b), the airbag cushion 114 in this embodiment expands and deploys along the windshield 108 to stop pedestrians that are about to contact the windshield 108. In addition, the airbag cushion 114 lifts and slightly raises the front hood 104. This action has the effect of softening the impact on pedestrians who come in contact with the front hood 104.

Figure 2:
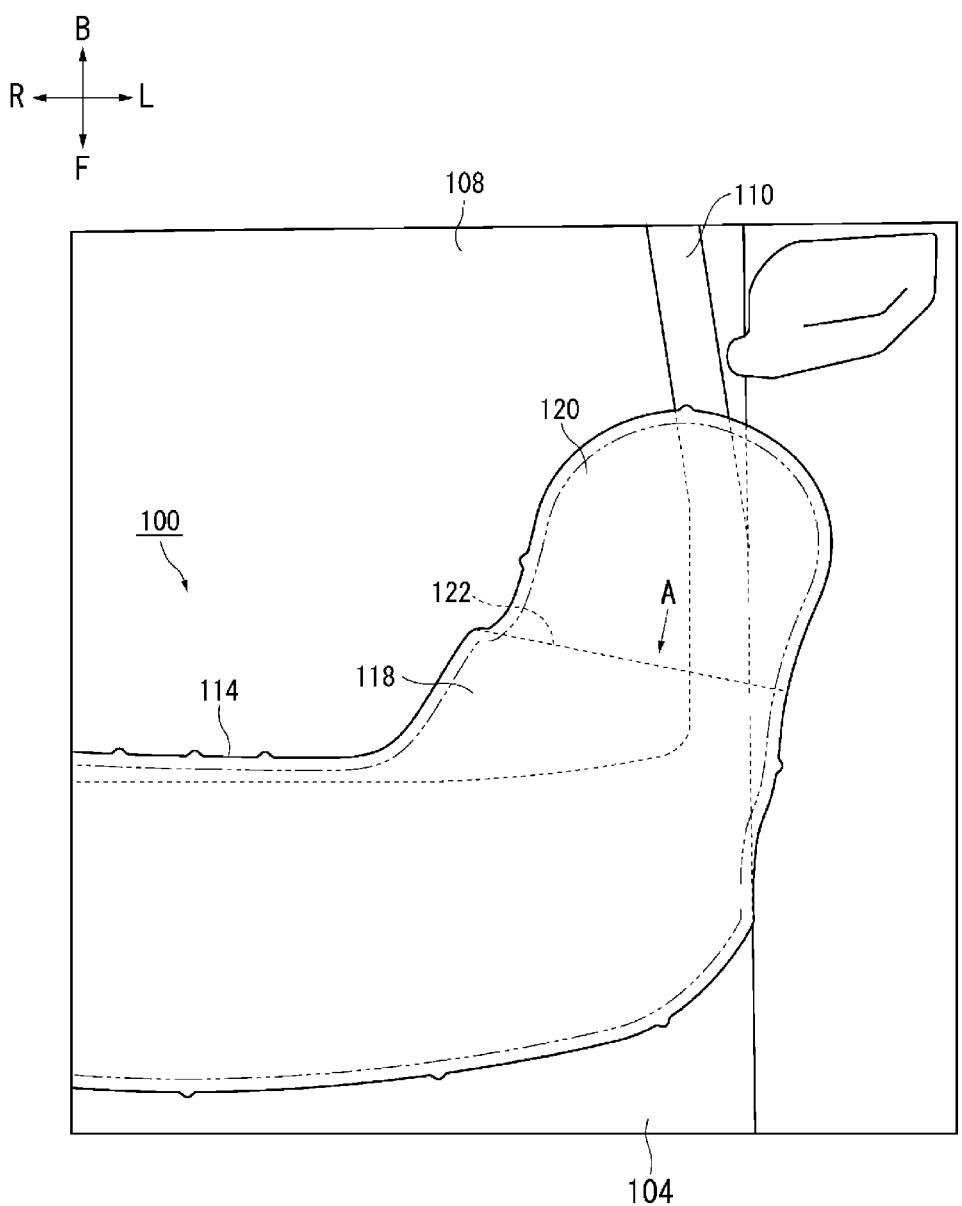
FIG. 2 is a diagram illustrating an expanded view of the airbag cushion of FIG. 1(a) from the left side and above in the vehicle width direction.

FIG. 2 is a diagram illustrating an expanded view of the airbag cushion 114 of FIG. 1(a) from the left side and above in the vehicle width direction. The airbag cushion 114 is bag shaped and formed by overlapping and sewing; alternatively, multiple base cloths (configuring the surface thereof) are adhered and overlapped or formed by spinning and weaving using an OPW (one-piece woven), or the like.

In this embodiment, the expansion region of the airbag cushion 114 where gas flows in and expands is divided into two chambers, a main chamber 118 and a pillar chamber 120.

The main chamber 118 receives gas from the inflator 112 and expands and deploys to cover at least a lower portion of the windshield 108 to receive a wider area of the body of the pedestrian. Pillar chambers 120 are provided on both ends of the main chamber 118 in the vehicle width direction, receive gas from the main chamber 118, and expand and deploy to cover an A-pillar 110, thus preventing the head or the like of the pedestrian from contacting the highly rigid A-pillar 110.

The main chamber 118 can be configured to lift the rear end vicinity of the front hood 104 from below, or can be configured to expand and deploy so as to overlap on the upper side of the rear end vicinity of the front hood 104. If the main chamber 118 lifts the vicinity of the rear end of the front hood 104, the front hood 104 can be raised to soften the impact of a pedestrian coming into contact with the front hood 104. If the main chamber 118 inflates and deploys so as to overlap on the upper side of the vicinity of the rear end of the front hood 104, the pedestrian protection can be provided over a larger area.

A compartment wall 122 that partitions the main chamber 118 from the pillar chamber 120 is provided inside the airbag cushion 114. The compartment wall 122 can be provided, for example, in a position that overlaps the vicinity of the base of the A-pillar 110. In this embodiment, as illustrated in FIG. 3 and the like, a check valve structure is provided in the compartment wall 122 to keep the internal pressure of the pillar chamber 120 higher for a longer period of time.

Figure 3A:
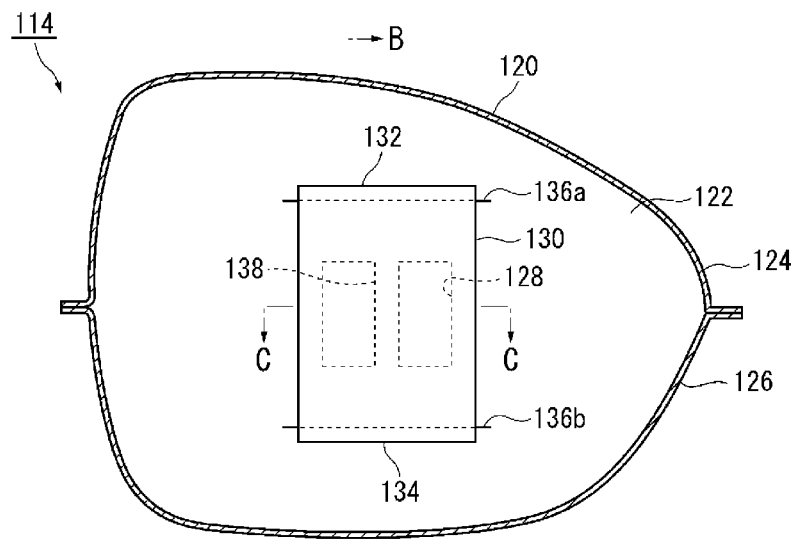
FIG. 3 illustrates an example of the compartment walls of the airbag cushion of FIG. 2 from various directions.

FIG. 3 illustrates an example of the compartment wall 122 of the airbag cushion 114 of FIG. 2 from various directions. FIG. 3(a) is a view of compartment wall 122 inside the airbag cushion 114 of FIG. 2, in the direction of Arrow A. As illustrated in FIG. 3(a), the airbag cushion 114 includes an upper outer panel 124 and a lower inner panel 126. The compartment wall 122 separates the main chamber 118 (see FIG. 2) from the pillar chamber 120 by partitioning the outer panel 124 and the inner panel 126 without gaps therebetween.

The check valve structure of the compartment wall 122 is achieved by an inner vent 128 in the compartment wall 122 and a patch 130 covering the inner vent 128. The inner vent 128 is the location where the gas passes through and is provided as a through hole through the compartment wall 122.

The patch 130 is attached to the pillar chamber 120 side of the compartment wall 122 so as to cover the inner vent 128 on the compartment wall 122. The patch 130 has, for example, an upper edge 132 and a lower edge 134 connected to the compartment wall 122 by sewn sections 136a and 136b, respectively, and a central portion other than the upper edge 132 and lower edge 134 has slack and can be separated from the compartment wall 122.

A bridge 138 passes over the inner vent 128. The bridge 138 serves to reinforce the inner vent 128 and prevents the compartment wall 122 from being easily stretched by the opening of the inner vent 128. For example, in this embodiment, the bridge 138 extends along the vertical direction to bisect the inner vent 128 in the vehicle width direction when the airbag cushion 114 is expanded and deployed. The bridge 138 in this configuration inhibits the inner vent 128 and the compartment wall 122 from extending in the vertical direction.

Figure 3B:
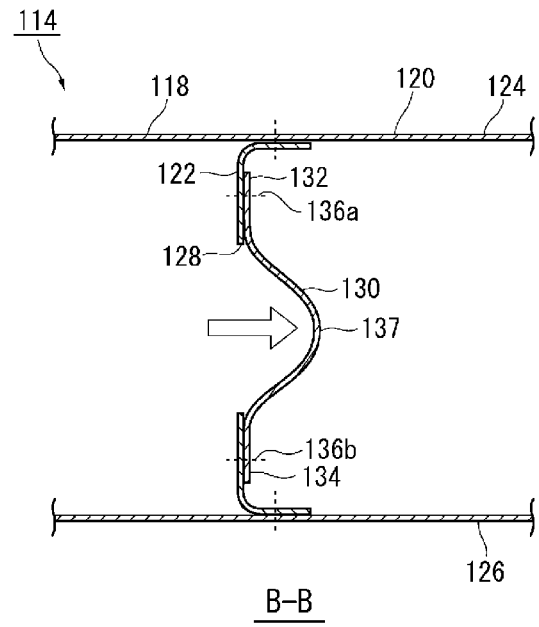

FIG. 3(b) is a cross-sectional view along line B-B of the airbag cushion 114 of FIG. 3(a). Furthermore, FIG. 3(b) illustrates the condition of the patch 130 as the gas flows from the main chamber 118 into the pillar chamber 120. During expansion and deployment of the airbag cushion 114, as gas pressure is applied from the main chamber 118 toward the pillar chamber 120, the pressure causes the portion of the slack 137 at the center of the patch 130 to separate from the compartment wall 122 toward the pillar chamber 120.

The slack 137 of the patch 130 is formed by attaching the upper edge 132 and lower edge 134 of the patch 130, which are spaced at a prescribed interval in the vertical direction of the patch 130, by sewn parts 136a and 136b at two locations on the compartment wall 122 at a spacing shorter than the spacing of the upper edge 132 and lower edge 134. This configuration allows the patch 130 to form slack 137, and when gas pressure is applied from the main chamber 118 side, the slack 137 portion separates from the compartment wall 122, allowing gas to pass through.

Figure 3C:
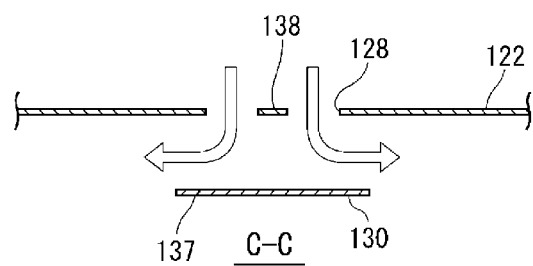

FIG. 3(c) is a cross section view along line C-C of the vicinity of the compartment wall 122 in FIG. 3(a). As mentioned above, the patch 130 has a slack 137 portion that separates from the compartment wall 122 based on the gas flowing through the inner vent 128 from the main chamber 118 (see FIG. 3(b)) to the pillar chamber 120. Thus, during expansion and deployment of the airbag cushion 114, the pillar chamber 120 can expand and deploy smoothly because the slack 137 at the center of the patch 130 is separated from the compartment wall 122.

Figure 4A:
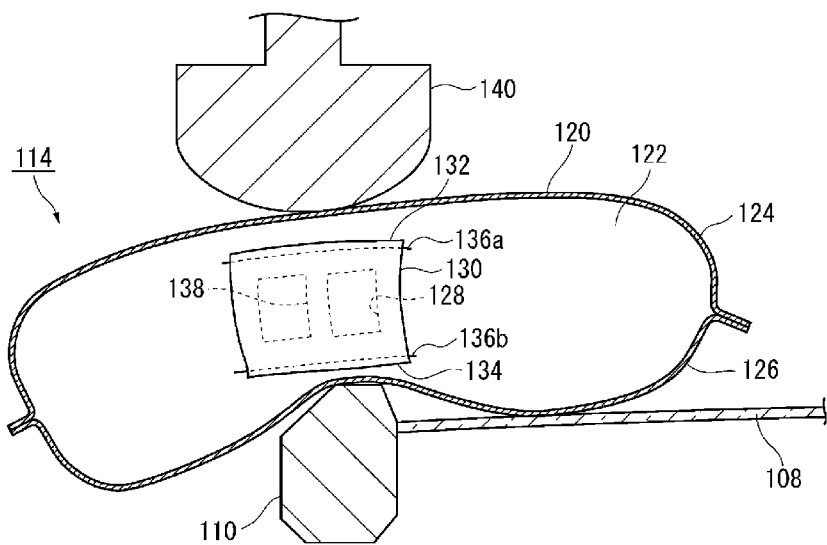
FIG. 4 is a schematic diagram during pedestrian restraint using the airbag cushion of FIG. 3.

FIG. 4 is a schematic diagram during pedestrian restraint of the airbag cushion 114 of FIG. 3. FIG. 4(a) illustrates the condition of the airbag cushion 114 of FIG. 3(a) during pedestrian restraint. FIG. 4(a) illustrates the condition when an impactor 140, a test device that simulates the head of a pedestrian, impacts the pillar chamber 120. The pillar chamber 120 expands and deploys to cover the edges of the A-pillar 110 and the windshield 108 to prevent a pedestrian from crashing into the vicinity of the highly rigid A-pillar 110.

Figure 4B:
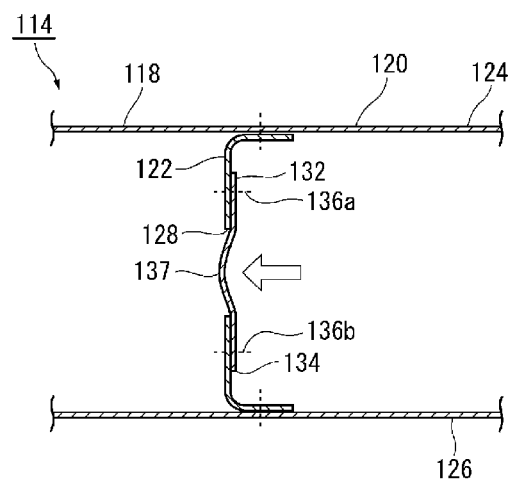

FIG. 4(b) illustrates the condition of the airbag cushion 114 of FIG. 3(b) when a pedestrian is restrained. When external pressure is applied to the pillar chamber 120, gas in the pillar chamber 120 attempts to exit from the inner vent 128, but the force of the gas at this time pushes on the slack 137 of the patch 130 against the compartment wall 122, thus blocking the inner vent 128 and maintaining the internal pressure in pillar chamber 120.

Figure 4C:
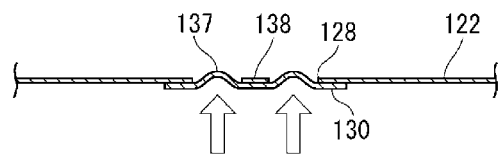

FIG. 4(c) illustrates restraint of the pedestrian in the vicinity of the compartment wall 122 in FIG. 3(c). As described above, when restraining a pedestrian, the patch 130 blocks the inner vent 128 in order to maintain the internal pressure of the pillar chamber 120.

As described above, the pedestrian airbag device 100 of the present embodiment can suitably maintain the internal pressure of the pillar chamber 120 by means of a check valve structure using the compartment wall 122 and the patch 130, and can suitably protect a pedestrian from contact with the rigid A-pillar 110. In particular, as illustrated in FIG. 4(a), a typical A-pillar 110 is narrower in width than the head of the pedestrian imitated by the impactor 140, inhibiting a reaction force from the A-pillar 110 when the airbag cushion 114 restrains the head of the pedestrian. However, in this embodiment, by increasing the internal pressure of the pillar chamber 120, a suitable reaction force can be obtained from the narrow A-pillar 110 to adequately restrain the head of the pedestrian.

Furthermore, as illustrated in FIG. 3(a), the bridge 138 transverses the inner vent 128, which suppresses spreading of the inner vent 128, and also suppresses stretching of the compartment wall 122 and the patch 130. For example, in FIG. 3(b), when gas is supplied to the airbag cushion 114, the compartment wall 122 is pulled by the outer panel 124 and the inner panel 126 trying to separate from each other. Herein, the expansion of the inner vent 128 is suppressed by the bridge 138, and thus elongation of the compartment wall 122 is suppressed. If the compartment wall 122 were to deform due to elongation, the upper edge 132 and lower edge 134 of the patch 130 will be pulled in directions away from each other, and the patch 130 will be pulled without any slack, inhibiting separation from the compartment wall 122. With the present embodiment, the patch 130 is maintained separated from the compartment wall 122 by suppressing the elongation of the compartment wall 122 and the patch 130, which allows for smooth expansion and deployment of the pillar chamber 120 and adequate protection of the pedestrian.

Furthermore, the bridge 138 can also prevent the thickness of the pillar chamber 120 from becoming excessively thick. As the thickness of the pillar chamber 120 increases, the overall volume of the airbag cushion 114 also increases, resulting in a lower internal pressure in the airbag cushion 114. With the present embodiment, the bridge 138 reduces the thickness of the pillar chamber 120 by suppressing elongation of the compartment wall 122, maintaining the internal pressure and reaction force of the airbag cushion 114 and allowing the airbag cushion 114 to adequately receive the pedestrian over the entire area.

Modified Example

Modified examples of each of the above-described components are described below. FIG. 5 is a diagram illustrating a modified example of a compartment wall 122 of FIG. 3(a). In FIG. 5, the same codes are attached to the same structural elements as those described above, and a description of the aforementioned structural elements is omitted. In the following description, components having the same name as a component already described are assumed to have the same function unless otherwise specified, even if marked with a different sign.

Figure 5A:
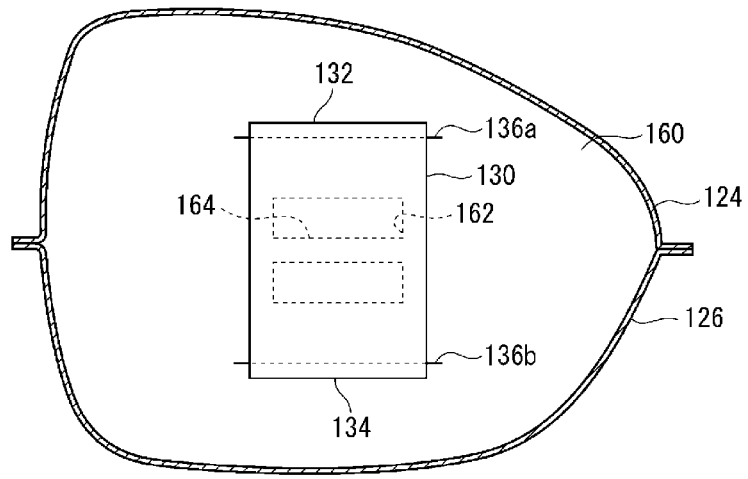
FIG. 5 is a diagram illustrating a modified example of a compartment wall of FIG. 3(a).

FIG. 5(a) illustrates a first modified example of the compartment wall 122 of FIG. 3(a) (compartment wall 160). The bridge 164 extends along the width direction of the vehicle on the compartment wall 160 so as to bisect the inner vent 162 in the vertical direction when the airbag cushion 114 expands and deploys. The bridge 164 in this configuration inhibits the inner vent 162 and the compartment wall 160 from extending in the width direction of the vehicle. According to this modified example, the patch 130 can be maintained to be detachable from the compartment wall 160 even when the compartment wall 160 is subjected to pulling forces in the vehicle width direction, thereby enabling smooth expansion and deployment of the pillar chamber 120 and adequate protection of pedestrians.

Figure 5B:
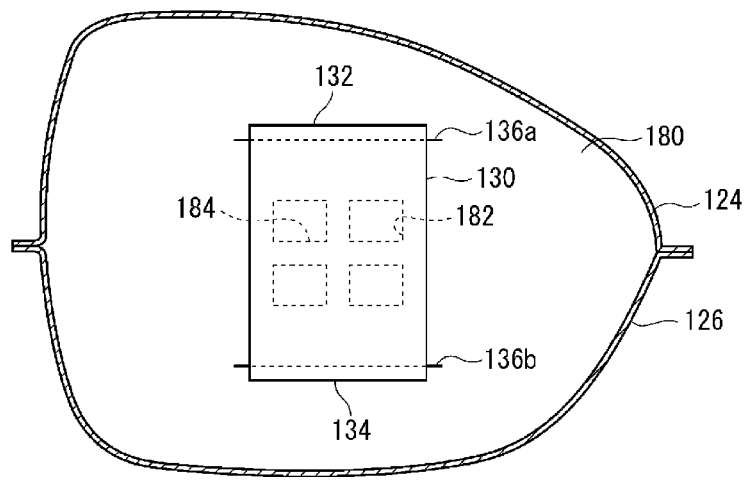

FIG. 5(b) illustrates a second modified example of the compartment wall 122 of FIG. 3(a) (compartment wall 180). The bridge 184 on the compartment wall 180 is provided in a shape that intersects in the inner vent 182. A bridge 184 of this configuration inhibits the inner vent 182 and compartment wall 180 from elongating in either the vertical direction or the vehicle width direction. With this modified example, detachability of the patch 130 from the compartment wall 180 can be maintained even when the compartment wall 180 is susceptible to pulling forces in the vertical direction and vehicle width direction, thereby enabling smooth expansion and deployment of the pillar chamber 120 and adequate protection of pedestrians.

Figure 6:
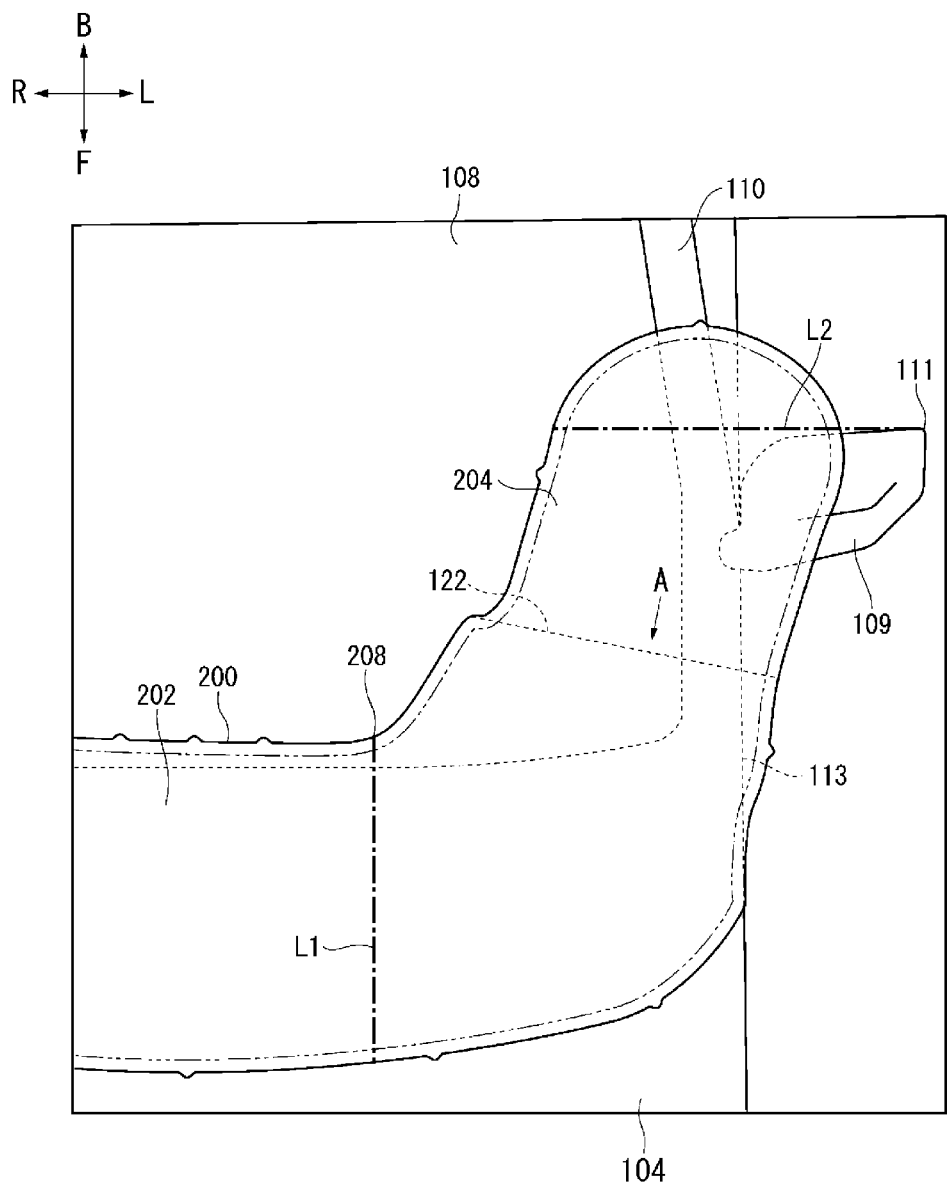
FIG. 6 is a diagram illustrating a modified example of the airbag cushion in FIG. 2.

FIG. 6 is a diagram illustrating a modified example (airbag cushion 200) of the airbag cushion 114 in FIG. 2. The inside of the airbag cushion 200 is also partitioned by the compartment wall 122.

The main chamber 202 expands and deploys to cover the lower portion of the windshield 108, extending in the width direction of the vehicle. The pillar chamber 204 receives gas from the main chamber 202 and expands and deploys in a state that extends from both sides of the main chamber 202 in the vehicle width direction along the A-pillar 110 to the rear of the vehicle beyond the vehicle door mirrors 109.

The airbag cushion 200 can have a compartment wall 122 at a prescribed location within the range illustrated by a first imaginary line L1 and a second imaginary line L2. The first imaginary line L1 is a straight line virtually extending to the front of the vehicle from the inner corner 208 formed at a point midway from the main chamber 202 to the pillar chamber 204 on the rear edge of the airbag cushion 200. The second imaginary line L2 is a straight line virtually extending in the width direction of the vehicle along the rear edge 111 of the door mirror 109.

The compartment wall 122 is a member that partitions the main chamber 202 and the pillar chamber 204. In other words, with this modified example, the airbag cushion 200 can be partitioned into a main chamber 202 and a pillar chamber 204 within the range from the first imaginary line L1 to the second imaginary line L2.

With this modified example, the patch 130 can be maintained to be separated from the compartment wall 122 by suppressing elongation of the compartment wall 122 and the patch 130 (see FIG. 3(a)). Therefore, this modified example can provide smooth expansion and deployment of the pillar chamber 204 on the terminal side of the airbag cushion 200 rather than the compartment wall 122, and can provide adequate protection of pedestrians.

In particular, the area from the first imaginary line L1 to the second imaginary line L2 of the airbag cushion 200 is the region that covers the highly rigid front portion of the vehicle, such as the side edge 113 of the vehicle hood, the A-pillar 110, the door mirrors 109, and the like. By providing the compartment wall 122 in this area, the expansion pressure of the pillar chamber 204 can be suitably maintained on the terminal side of the airbag cushion 200 more so than on the compartment wall 122, and thus pedestrian contact with highly rigid parts such as the A-pillar 110 and the door mirror 109 can be adequately prevented.

Preferred examples of the present invention were described above while referring to the attached drawings. However, the embodiments described above are preferred examples of the present invention, and other embodiments can be implemented or performed by various methods. In particular, unless described otherwise in the specification of the present application, the invention is not limited to the shape, size, configurational disposition, and the like of parts illustrated in detail in the attached drawings. Furthermore, expressions and terms used in the specification of the present application are used for providing a description, and the invention is not limited thereto, unless specifically described otherwise.

Therefore, it is obvious that a person with ordinary skill in the art can conceive various changed examples or modified examples within the scope described in the scope of the claims, which is understood to naturally belong to the technical scope of the present invention.

INDUSTRIAL APPLICABILITY

The present invention can be used as a pedestrian airbag device having an airbag cushion that expands and deploys from below a front hood of a vehicle toward a windshield, and an inflator that supplies gas to the airbag cushion.

DESCRIPTION OF CODES

100 . . . Pedestrian airbag device, 102 . . . Vehicle, 104 . . . Front hood, 106 . . . Front bumper, 108 . . . Windshield, 109 . . . Door mirror, 110 . . . A-pillar, 112 . . . Inflator, 113 . . . End part, 114 . . . Airbag cushion, 116 . . . Housing 118 . . . Main chamber, 120 . . . Pillar chamber, 122 . . . Compartment wall, 124 . . . Outer panel, 126 . . . Inner panel, 128 . . . Inner vent, 130 . . . Patch, 132 . . . Upper edge, 134 . . . Lower edge, 136a, 136b . . . Seam, 137 . . . Slack, 138 . . . Bridge, 140 . . . Impactor, 160 . . . Compartment wall of first modified example, 162 . . . Inner vent, 164 . . . Bridge, 180 . . . Compartment wall of second modified example, 182 . . . Inner vent, 184 . . . Bridge, 200 . . . Airbag cushion, 202 . . . Main chamber, 204 . . . Pillar chamber, 206 ... Compartment wall, 208 ... Internal angle, L1 ... First imaginary line, L2 ... Second imaginary line

The invention claimed is:

1. A pedestrian airbag device having an airbag cushion for expanding and deploying from below a front hood of a vehicle toward a windshield, and an inflator that supplies gas to the airbag cushion, wherein
the airbag cushion comprises:
a main chamber that receives gas from the inflator and expands and deploys to cover at least a lower portion of the windshield;
a pillar chamber provided at both ends of the main chamber in a vehicle width direction, the pillar chamber for receiving gas from the main chamber to expand and deploy the pillar chamber for covering an A-pillar;
a compartment wall dividing the main chamber from the pillar chamber;
a rectangular inner vent penetrating the compartment wall through which the gas can pass, the inner vent including first and second rectangular openings;
a bridge that passes over the inner vent to separate the inner vent into the first and second rectangular openings; and
a patch attached to a pillar chamber side of the compartment wall for covering the inner vent, the patch being partially separable from the compartment wall, wherein the patch is attached to the compartment wall at a first seam and a second seam, the first and second seams being parallel to one another and spaced apart from one another by a first distance along the patch, the patch being separable from the compartment wall between the first and second seams, the bridge extending perpendicular to the first seam and second seam so as to separate a flow of gas towards opposite unattached sides of the patch,
wherein the first and second openings both include a top side and a bottom side parallel to the first and second seams, and first and second lateral sides perpendicular to the first and second seams such that the flow of gas through the first and second openings from the main chamber to the pillar chamber is directed in first and second opposite directions parallel to the first and second seams.

2. The pedestrian airbag device according to claim 1, wherein:
the main chamber receives gas from the inflator, and the main chamber is configured to expand and deploy in the vehicle width direction to cover at least a lower portion of the windshield;
the pillar chamber receives gas from the main chamber and expands and deploys in a state that extends from both sides of the main chamber in the vehicle width direction along the A-pillar to a rear of the vehicle beyond a pair of vehicle door mirrors; and
the compartment wall is provided in a range between a first imaginary line extending from an inner corner formed at a prescribed location on a rear edge of the airbag cushion between the main chamber and the pillar chamber to a front of the vehicle, and a second imaginary line extending along the rear edge of the pair of vehicle door mirrors in the vehicle width direction.

3. The pedestrian airbag device according to claim 1, wherein a portion of the main chamber is configured to expand and deploy to overlap an upper side of the front hood in a vicinity of a rear end of the front hood.

4. The pedestrian airbag device according to claim 1, wherein the patch has a slack that allows separation from the compartment wall.

5. A pedestrian airbag device according to claim 4, wherein the slack of the patch is formed by attaching at least two locations of the patch at a prescribed interval to two locations on the compartment wall at an interval that is shorter than the patch.

6. The pedestrian airbag device according to claim 1, wherein the bridge is provided to bisect the inner vent in a width direction of the vehicle when the airbag cushion is expanded and deployed.

7. The pedestrian airbag device according to claim 6, wherein the bridge is provided to further bisect the inner vent in a vertical direction when the airbag cushion is expanded and deployed.

8. A pedestrian airbag device according to claim 1, wherein the bridge is provided in a shape that intersects within the rectangular inner vent.

9. The pedestrian airbag device according to claim 2, wherein a portion of the main chamber expands and deploys so as to overlap an upper side in a vicinity of a rear end of the front hood.

10. The pedestrian airbag device according to claim 2, wherein the patch has a slack that allows separation from the compartment wall.

11. The pedestrian airbag device according to claim 3, wherein the patch has a slack that allows separation from the compartment wall.

12. An airbag cushion for pedestrian airbag device, the airbag cushion inflatable by an inflator for expanding and deploying from below a front hood of a vehicle toward a windshield, the airbag cushion comprises:
a main chamber that receives gas from the inflator and expands and deploys to cover at least a lower portion of the windshield;
a pillar chamber provided at both ends of the main chamber in a vehicle width direction, the pillar chamber for receiving gas from the main chamber to expand and deploy the pillar chamber for covering an A-pillar;
a compartment wall dividing the main chamber from the pillar chamber;
a rectangular inner vent penetrating the compartment wall through which the gas can pass, the inner vent including a plurality of rectangular openings;
a bridge that separates the inner vent into the plurality of rectangular openings; and
a patch attached to a pillar chamber side of the compartment wall for covering the rectangular inner vent, the patch being partially separable from the compartment wall, wherein the patch is attached to the compartment wall at a first seam and a second seam, the first and second seams being parallel to one another and spaced apart from one another by a first distance along the patch, the patch being separable from the compartment wall between the first and second seams, the bridge extending perpendicular to the first seam and second seam so as to separate a flow of gas towards opposite unattached sides of the patch,
wherein the first and second openings both include a top side and a bottom side parallel to the first and second seams, and first and second lateral sides perpendicular to the first and second seams such that the flow of gas through the first and second openings from the main chamber to the pillar chamber is directed in first and second opposite directions parallel to the first and second seams.

13. The pedestrian airbag device according to claim 12, wherein the patch has a slack that allows separation from the compartment wall.

\* \* \* \* \*